United States Patent [19]
Bishop

[11] Patent Number: 4,911,318
[45] Date of Patent: Mar. 27, 1990

[54] AIR TRANSPORTABLE CONTAINER ADJUNCT

[75] Inventor: Frank W. Bishop, Norfolk, England

[73] Assignee: American Coastal Industries, Arlington, Va.

[21] Appl. No.: 288,093

[22] Filed: Dec. 22, 1988

[51] Int. Cl.4 .............................................. B65D 88/00
[52] U.S. Cl. .................................... 220/1.5; 414/498;
248/146; 108/51.1; 220/69
[58] Field of Search ............... 414/495, 498; 294/68.1;
248/146, 188.2, 188.6, 128, 136, 151, 370;
108/51.1, 56.1, 52.1; 206/45.14, 45.16, 45.19,
218; 220/9.2, 9.3, 6, 1.5, 69

[56] References Cited

U.S. PATENT DOCUMENTS

| | | | |
|---|---|---|---|
| 2,776,775 | 1/1957 | Averhill | 108/56.1 X |
| 2,781,936 | 2/1957 | Bitney | 108/56.1 X |
| 3,599,817 | 8/1971 | Barsman, Jr. | 414/498 |
| 3,743,125 | 7/1973 | Ashley, Jr. | 414/498 |
| 3,784,054 | 1/1974 | Mautz | 220/1.5 X |
| 4,240,359 | 12/1980 | Howe | 108/56.1 X |
| 4,319,732 | 3/1982 | Godfrey | 108/56.1 X |

FOREIGN PATENT DOCUMENTS

| | | | |
|---|---|---|---|
| 3407568 | 9/1985 | Fed. Rep. of Germany | 414/498 |
| 0956362 | 9/1982 | U.S.S.R. | 220/1.5 |

Primary Examiner—Robert J. Spar
Assistant Examiner—James R. Bidwell
Attorney, Agent, or Firm—Eric P. Schellin

[57] ABSTRACT

The skid device of the present invention includes two skid plates having a rectangular configuration. Each of the skid plates are mounted underneath a flatrack container along an underside longitudinal edge portion of the flatrack. The mounting to the underside is through a plurality of linkages having one end secured to the top of each of the skid and the second end secured to the underside of the flatracker container. The linkages are dimensioned and provided with a drive for progressively lowering the skid whereby the flatrack container rests on the skids when so desired. Locks are provided whereby the linkages may be locked at one of several altitudes. The drive also returns the skid to its folded position in confronting relationship with the underside of the flatrack container and the latter rests on two beams spaced from a longitudinal centerline of the flatrack container. The drive is generally disposed to drive the respective linkages of both skids simultaneously.

5 Claims, 7 Drawing Sheets

AIR TRANSPORTABLE CONTAINER ADJUNCT

FIELD OF THE INVENTION

The adjunct of the present invention as a retrofitted item as part of original equipment enables pallets and containers as currently developed and constructed to be used with conventional truck vehicle pallet load and unload systems (PLS). The containers with the adjunct have the additional virtue of being able to be loaded into military aircraft and civil aircraft with floors and roller systems configured as military aircraft, without the use of form of interface device.

BACKGROUND OF THE INVENTION.

In order to ensure that all types and makes of flatracks, pallets, containers and other derivatives can be operated equally by any of the military vehicles which are subject to an interservice agreement and even intercountry harmonization plan the base design and dimensions have been duly standardized.

The principle features call for a flatrack with two main beams or girders which are equally spaced on either side of a longitudinal centerline of the flatrack with the inner faces of the beams set between 901 mm and 906 mm apart and the outer faces set between 1060 mm and 1065 mm apart. The details also call for a clear and un-encumbered height between the underside of the flatrack floor and cross supports, and the lower face of the two main beams, and between the front and rear frame assemblies, of not less than 150 mm. This space is desired to ensure that when loaded onto the vehicle, the flatrack provides adequate "bump clearance" for the operating truck wheels in the areas outside of the main beams, and clearance for the truck's hooklift crane operating mechanism to be housed between the main beams.

In those instances when the aforesaid clearance of the flatrack is less than 150 mm as is often found in the standard PLS flatrack it will be necessary to increase the height of the two main beams by an additional about 45 mm.

The dimensions and spacing of the beams is also critical to the loading and unloading system employed on the vehicle, in that the beams act as guide and support rails during the loading, transfer to a trailer, and unloading operations working in conjunction with a guidance roller assembly mounted at the top rear of the vehicle's main chassis.

It should be noted that the flatrack also must have appropriate corner fittings or blocks to be provided at each lower corner of the flatrack. The corner fittings must have a bottom face 17.5 mm below any other part of the flatrack, and therefore, the footprint of the flatrack to be used herein consists of the four lower faces of the corner fittings or blocks which are each 178 mm × 162 mm, set at the corners of a total base area of 2.438 mm × 6,650 mm maximum.

Due to the fact that the aircraft must be as light as possible, a heavy duty cargo floor cannot be used and, therefore, the footprint of the container must be such so that it will distribute the total load of the container over the largest possible area of the aircraft floor. Furthermore, heavy loads must be pushed or rolled into one or other ends of the aircraft or in some limited cases through a doorway in the side of the aircraft. In order to accommodate this loading difficulty aircraft floor roller systems of predetermined dimensions and configurations have been utilized and aircraft loaders with matching roller systems have been developed. Unfortunately, however, the roller systems for each aircraft is dimensioned and configured somewhat differently.

Figure 4:
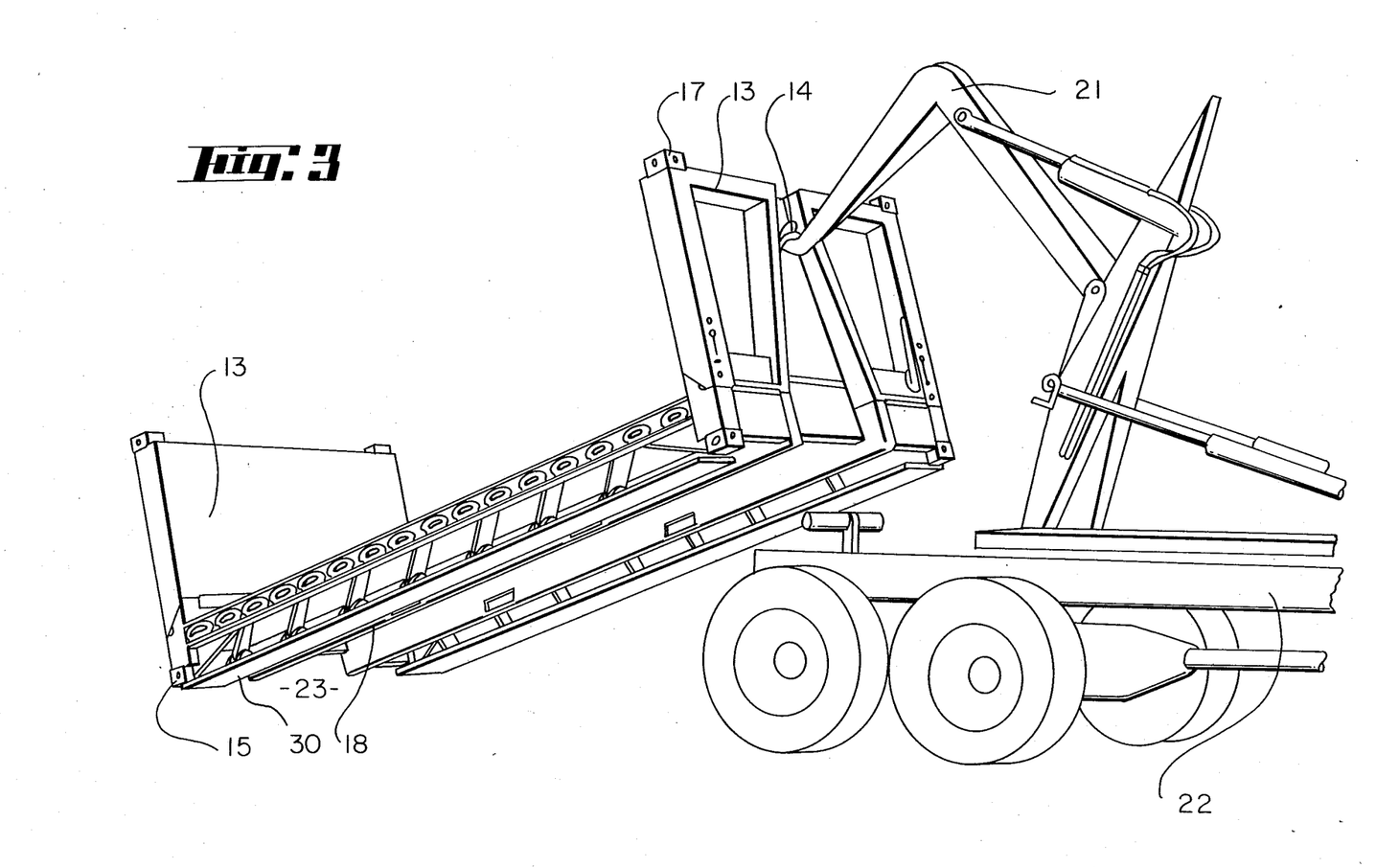
FIG. 4 is a perspective view of prior art adapter skid.

It is an object of the present invention to disclose a container that may be carried on vehicles and may then be transferred to an aircraft loader. In the past a conventional acceptable flatrack is fitted with skids along and under the longitudinal edge portions thereof. Such a prior art skid can be seen from FIG. 4, wherein an elongated skid 100 has a rectangular configuration. It has an upstanding outer wall 101. A skid is positioned alongside and underneath at each longitudinal edge of the flatrack. The skid may be bolted to the front and rear corner fittings of the flatrack through bores 102. The skid is therefore about 18 inches wide and about twenty feet in length. The skid has a running length extending portion 103 beyond the side longitudinal sides of the flatrack terminating in a shoulder 104 adapted to be embraced by conventional clamps disposed in the aircraft's floor. The problem with the use of the skids of the prior art is that they are separable added-on elements that may be bolted on permanently but then the flatrack cannot be used on a vehicle because of the need for the space to accommodate the wheels of the vehicle as heretofore mentioned. If the skids are removed they are subject to becoming misplaced and are then not available for use when needed.

It is therefore a primary object of the present invention to disclose skid adjuncts for a flatrack container that is affixed to the flatrack in a permanent manner, is foldable out of the way for storage and is unfurled into a use position when desired all without unduely increasing the weight of the entire assemblage.

It will be seen that the skids are extendable to increase the unit width from 96 inches to 108 inches in order to engage the aircraft locking system and are designed to be the lowest point of the unit. By being of a sufficient width of 18 inches they ensure direct contact with all of the known aircraft/loader roller configurations. The skid adjunct is capable of supporting the total maximum load of 16.5 metric tons imposed by the unit and spreading that load through the aircraft/loader floor. The skid adjunct is a part of the flatrack unit, but when not in use as aircraft load spreaders the folded skids do not interfere with the primary function of the flatrack in it's PLS role. Furthermore, the mechanical operation of the load spreader skids is achieved manually by one person without the use of separate operating equipment.

SUMMARY OF THE INVENTION

The skid device of the present invention includes two skid plates having a rectangular configuration. Each of the skid plates are mounted underneath a flatrack container along an underside longitudinal edge portion of the flatrack. The mounting to the underside is through a plurality of linkage means having one end secured to the top of each of the skids and the second end secured to the underside of the flatrack container. The linkage means is dimensioned and provided with drive means for progressively lowering the skids whereby the flatrack container rests on the skids when so desired. Locking means is provided whereby the linkage means may be locked at one of several attitudes. The drive means also returns the skid to its folded position in confronting relationship with the underside of the flatrack container and the latter rests on twobeams spaced from a longitudinal centerline of the flatrack container. The said drive mean is generally disposed to drive the respective linkage means of both skids simultaneously.

BRIEF DESCRIPTION OF THE INVENTION

FIG. 3 is the same perspective view as FIG. 2 where the spreader in a down position.

FIG. 8 is a cross section of FIG. 8—8 of FIG. 5.

DETAILED DESCRIPTION OF THE INVENTION

Figure 1:
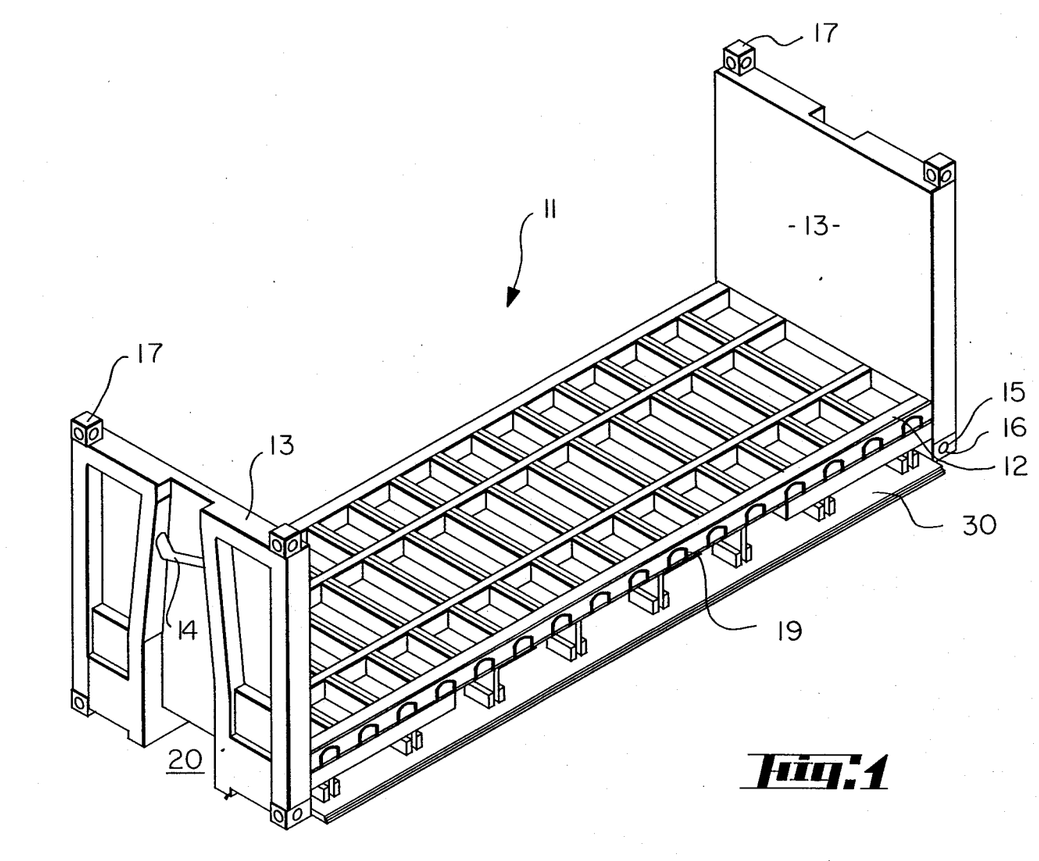
FIG. 1 is a perspective view of a flatrack with the accessory spreader of the present invention in a down position.

Beginning with FIG. 1, there is depicted a conventional flatrack, generally 11, having a horizontally disposed floor 12 and inwardly foldable vertical ends 13. The floor is designed to carry a substantial load of a number of tons. At least one of the ends 13 has a bail bar 14 recessed therein whereby the flatrack may be lifted by various cranes or lifthooks (not shown) Of interest, is the feature that the flatrack is supported at only its corners on lower blocks 15 each of which has apertures 16 therein. It should be noted that the vertical ends 13 have similar upper blocks 17.

The flat rack 11 is constructed to permit positioning another flatrack upon a first flatrack with the lower blocks 15 positioned on the upper blocks 17 of a flatrack therebelow. As a matter of fact the ends are capable of supporting a multi-storied load of flatracks of one upon another without difficulties even though each flatrack may be carrying a substantial load.

Figure 2:
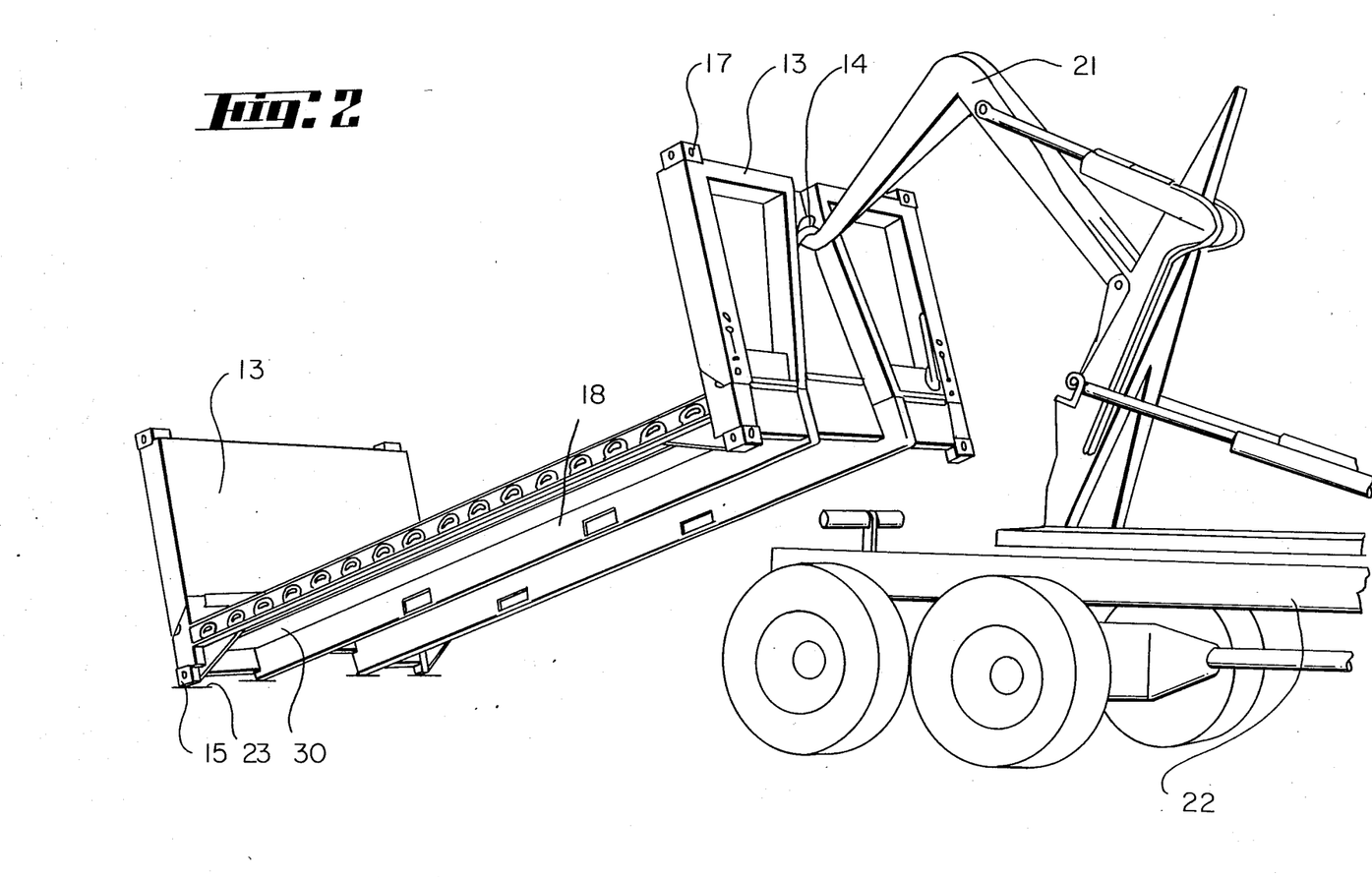
FIG. 2 is a perspective view of a flatrack being off loaded with spreader in a non-down position.

The flatrack is capable of being lifted at one end 13 by the bail bar 14 by a conventionally disposed crane foldably mounted on a specialized truck vehicle designed for the purpose of both pivotally lifting the flatrack off the ground at the tail end of such a truck and for retracting the flat rack up onto the truck (See FIGS. 2 and 3). The flatrack has its floor mounted onto two spaced elongated box girders 18. The space 20 between the girders is designed to fit over the recessed crane that protrudes out of a longitudinally disposed channel on the truck bed (not shown).

For a better understanding of the lifting operation, attention is directed to FIGS. 2 and 3. Note therefrom that the lifthook 21 is shown to have grasped the bail bar 14 at one end of the flatrack and has lifted one end to a position above the tail end of truck 22. The other end of the flat rack is supported by the ground 23. To prevent the end of the flatrack from being dragged across the ground the truck is put into reverse. By judiciously backing the truck with concomitant retraction by the lifthook 21 it is possible to load the flat rack on to the bed of the truck with a minimum of dragging whilst the lifthook itself is retracted into said suitably disposed longitudinally disposed channel in the the bed of the truck.

Of course, unloading may be achieved in a similar way except as the far end of the flatrack is pivotted on the ground, the truck is judiciously moved forward to free the tail end thereof from the other end of the flatrack as it is brought to the ground.

However, before the flatrack is brought to the ground, the skids 30 of the present invention are brought into position. In FIG. 2, the skids 30 are not in position but are folded upwardly and inwardly, i.e. out of the way. In FIG. 3 the skids have been brought into their downward position. More details will be supplied below as to why it is necessary to move the skids to their downward position while the flatrack is in an angled or elevated position. But first, details of the skids are provided.

Figures 4, 11:
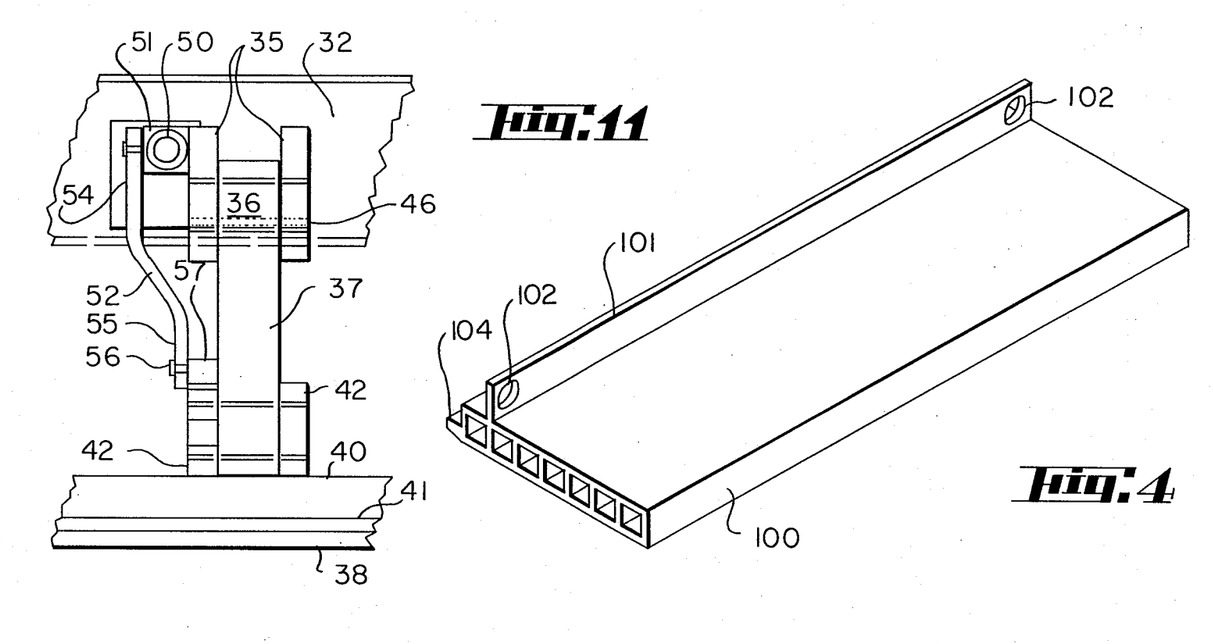
FIG. 11 is a side view of a fragment of the linkage means with the spreader plate in a down position.
Figures 5, 6:
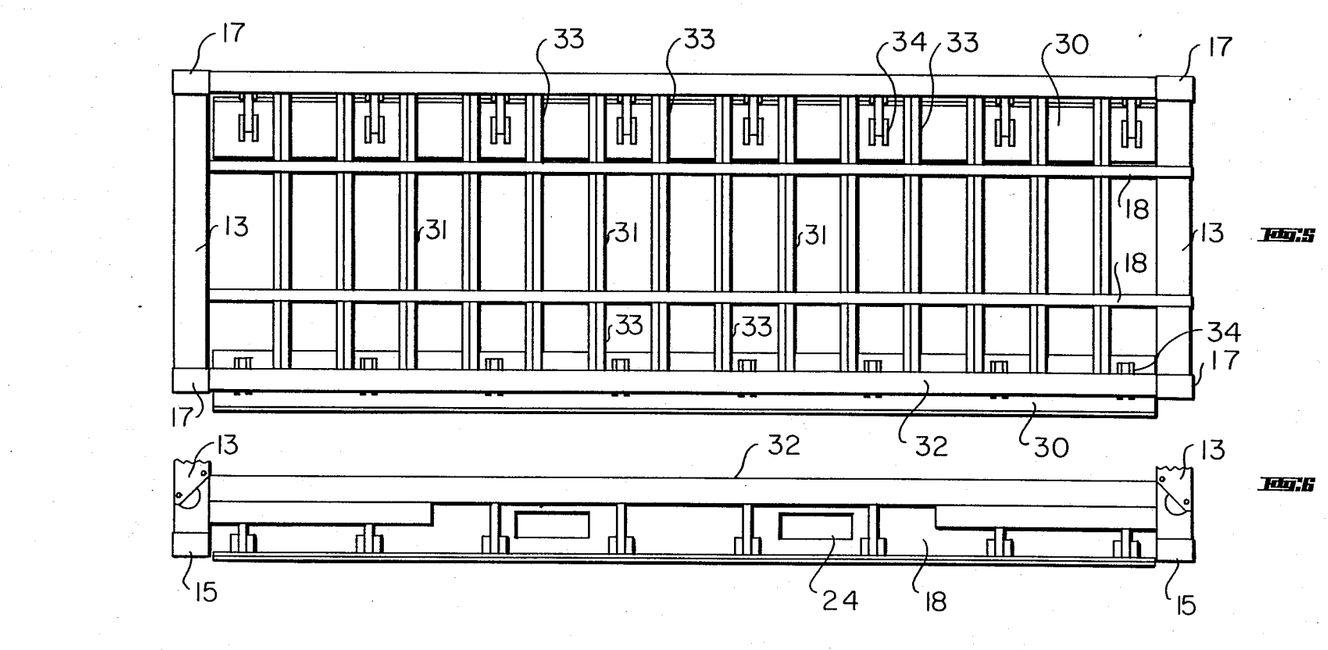
FIG. 5 is a top plan view.
FIG. 6 is a side elevation.
Figure 6:
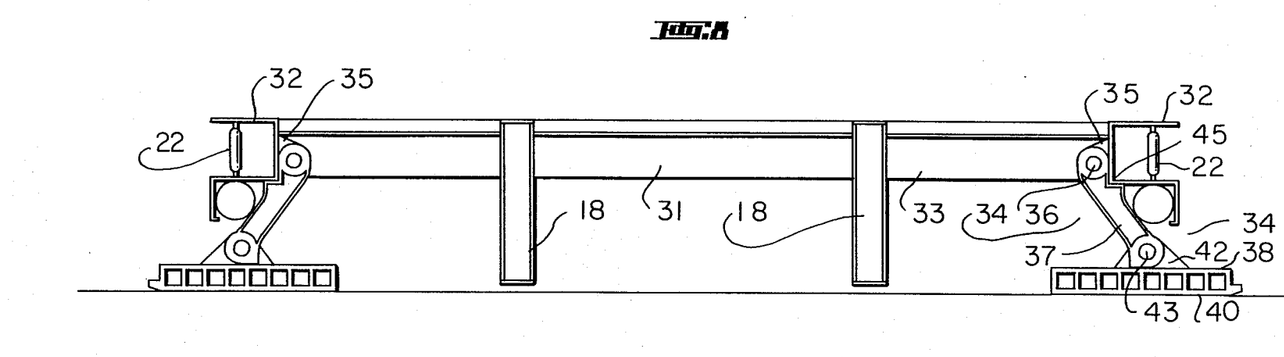

In regard thereto attention is directed to Figures 5–11. FIG. 5 is a top plan view of flatrack 11 which is constructed of metal and sits on two spaced box girders 18. The ends 13 are shown in fragmentary form in FIG. 6. The box girders 18 are provided with cross strusses 31 which extend between the box girders. At each of the longitudinal edges of the flatrack is an outwardly facing "s" girder 32 which carries a plurality of "d" shaped tie down looks 29 (See FIG. 1). The space between the "S" girders is also fitted with equi-distantly spaced strusses 33. The entire area is then covered with a suitable flooring of wood or metal (not shown).

Figure 7:
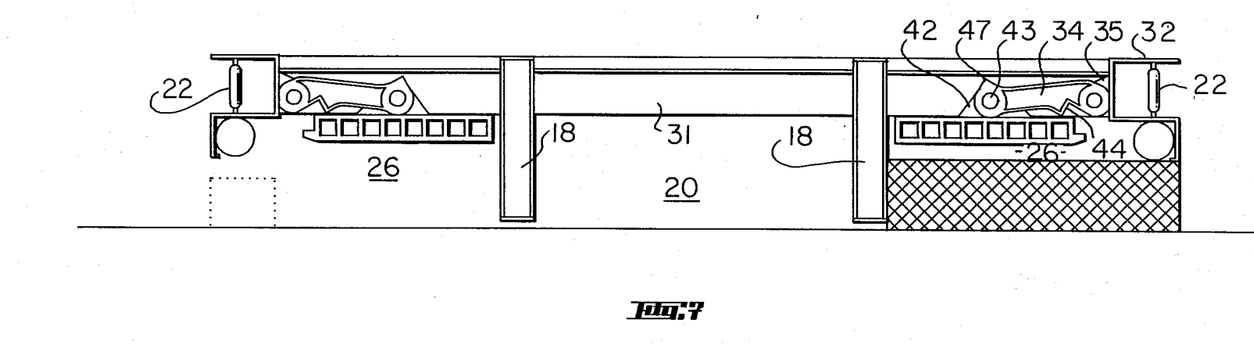
FIG. 7 is a cross-section along lines 7—7 of FIG. 2.

The skid 30 at the top of FIG. 5 is shown in its folded tucked in position of FIG. 7 while the skid 30 in the lower part shows the skid in its most downward position of FIG. 8. It should be appreciated however that in practice due to the raising and lowering mechanism supplied each of the pair of skids move up or down in tandem as the mechanical linkages are so constructed to achieve this end result. Of course, it would be possible to provide a variance whereby each skid may be manipulated independently.

Each of the skids is provided with a plurality of mechanical linkage means 34 designed to pivotally carry the skid to a lowermost position and a folded position. Each of each linkage means is adapted to fit between the parallelly disposed strusses 33.

The skids 30, from FIGS. 5 and 6 are seen to be elongated but do not extend all the way to the respective ends of the flatrack. As the skid must be able to be swung into its most downward position while its one end is on the ground in FIGS. 2 and 3, the skids must be slightly foreshortened. This is especially true when the skid is brought into the position shown in FIG. 8, for instance, because during its descent it transcribes about 122° of arc which means that when it is at about 90° of arc the bottom of the skid extends below the box girders 18 and, more importantly below the lower support blocks 15.

Figure 9:
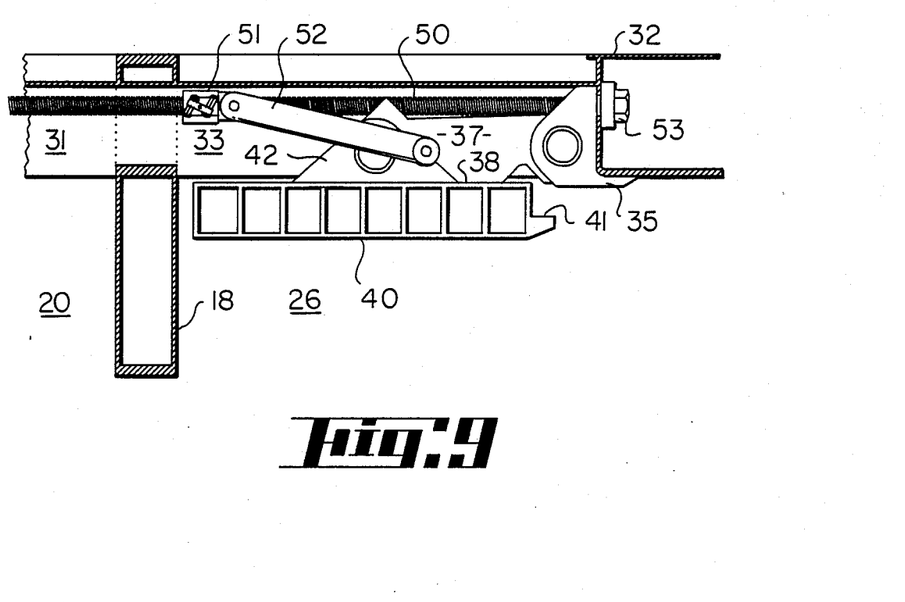
FIG. 9 is an end view of the linkage means to lower the spreader plate.
Figure 10:
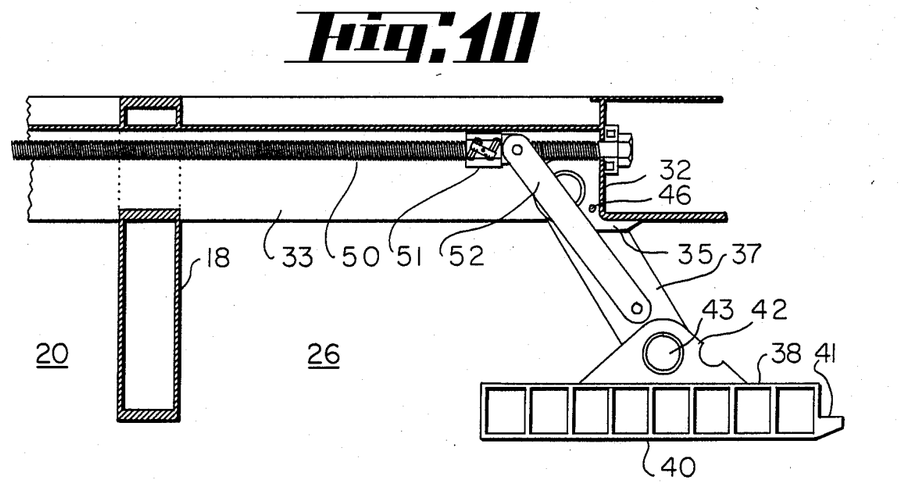
FIG. 10 is an end view of the same linkage means with the spreader plate in a down position.

A plurality of linkage means 34 (actually eight in number on each side in the instant embodiment) is pivotally mounted at one end to the rear side of the "S" girder between a pair of ears 35. In FIGS. 7 and 8 one of the pairs of ears is not shown whereby to show the axle pin 36 about which one end of lever 37 is pivotally attached. In FIGS. 9, 10 or 11 the missing ear 35 of the pair is shown. The skid 30 is constructed of extruded metal such as aluminum having a relatively thin rectangular cross-sectional configuration with a relatively large top and bottom surfaces 38 and 40 of approximately 18 inches in width by somewhat less than twenty feet in length. Each outwardly facing edges of the skids has an outwardly extending shoulder portion 41 adapted and constructed to permit the clamp in the floor of a cargo plane to be releasably affixed thereto (not shown).

The top surface 38 of the skid is fixed with a plurality of spaced pairs of upwardly extending ears 42, a pair for each linkage means 34. Again only one of the ears is shown positioned in FIGS. 7 and 8, while in FIG. 9 and 10 the other missing ear can be seen. In FIG. 11 the pair of ears in the "S" girder and the pair of ears on the skid can be clearly discerned.

For a more detailed consideration of the mechanical linkage means 34, special attention is directed to FIGS. 7 and 8.

One end of lever 37 is pivotally mounted through a suitably dimensioned bore by axle pin 43. In order to transfer the stress of the load of the flatrack away from axle pin 36 the lever 37 is supplied with a shoulder 44 which abuts against a corner 45 of the "S" girder. To prevent an unseating of the shoulder 44 from corner 45 a pin 46 positioned in at least one of the pairs of ears 35 of each side carrying a skid to thereby lock the lever 37 against untoward arcuate motion away from the said seat should the skid be given an inwardly directed lateral bump which can occur as the flatrack is moved about. The pin 46 is also employed to lock the linkage means in its upwardly folded position by pin alignment through suitably disposed bores in a set of ears 35 and lever 37.

The other end of the lever has a stop 47 which abuts against the upper surface 38 of the skid 30 whereby to limit the arcuate movement of the skid form its horizontally disposed position which is primarily achieved by the fact that the skid is essentially equally balanced about axle pin 43.

Attention is now directed to FIGS. 9 and 10 for a review of the ball and screw mechanism useful is carrying out the lowering and raising of the skids. The manipulating means need only be located in conjunction with a single somewhat centrally located linkage means. In one embodiment it includes an elongated screw 50 which extends from one edge to the other edge of the flatrack travelling nuts 51 are threadly attached to the screw 50, one for each side linkage means but only one side is shown. The travelling nut has one end of a lever 52 attached thereto while its other end is pivotally attached to near the end of the lever 37 proximate the end thereof attached to the skid.

The screw 50 is journalled through the "S" girder and terminates in head 53. The head 53 may be rotated by a bell crank (not shown). The bell crank may be foldable and permanently affixed to the head adapted and constructed to be locked into position out of the way in the confines of the "S" girder whereby the screw is prevented from rotating from a set position thereby further maintaining the skid in a preselected position. FIG. 11 shows another view of the lever 52 which is pivotally attached at one of its ends 54 to the travelling nut and the other end 55 to the lever 37 through an elongated pin 56 and bushing 57.

While FIGS. 5 to 10 show the skid in either its folded tucked in place position or in a fully extended position it is contemplated that the skid may be extended downwardly whereby the lever 37 is vertical and the skids on each side describe a narrower foot print as would be necessary if the flatracks are positioned side by side in some aircraft. In such an instance suitable locking pins are provided for the ears 35 and lever 37 whereby further arcuate movement is prevented.

In the foregoing in conjunction with FIGS. 2 and 3, there has been a discussion of either folding under the skids or descending the skids when the flat rack is at an angle with the ground supported thereby at one end thereof and by the lifthook of the truck at the other end.

In some instance it may not be propitious to accomplish the folding or unfolding as described. The lowering or raising may also be accomplished when the loaded flat rack is on the ground. In such an instance the skids are lowered to a position whereby they are below the fork lift openings fork lift opening 24. The fork lift tines are then inserted, the flatrack is raised above the ground and the lowering of the skids is either completed to where the lever is vertical or is completed through its full arcuate swing.

All bearings and bushings are turned from a polymer Nylotron GS which is self-lubricating, and acts as a suitable barrier between the aluminum ears and pivot arms and the hardened steel pivot pins.

In another embodiment the skid plate can be all-steel fabrication, or aluminum with a polymer Nylotrn insert strip in the lower face which will facilitate roller movement during loading and unloading in the aircraft.

What is claimed is:

1. An elongated skid adjunct for attachment to an elongated flatrack container having a bottom and being supported on two downwardly depending beams spaced from a longitudinal center line and each spaced from a longitudinal edge along the flatrack said skid adjunct having a relatively thin elongated rectangular plate, said plate having its longest length less than the length of the flatrack, said plate having a bottom surface, said plate having an upper surface, a plurality of linkage means, each of said linkage means having a first end and a second end, a first means mounted on said upper surface adapted and constructed to pivotally attach said first end of said linkage means to said plate, a second means mountable to said underside of said flatrack adapted and constructed to pivotally attach said second end of said linkage means to operatively attach said second end to said underside when said second means is mounted to said underside, drive means to progressively drive said linkage means whereby said first end of linkage means and second end of said linkage means pivots whereby said plate is moveable from a folded up position in confrontation with said underside to an extended position whereby said flatrack rests on said skid.

2. The elongated skid adjunct of claim 1 wherein two skid adjuncts are operatively associated on each longitudinal side of the elongated flatrack.

3. The elongated skid adjunct of claim 2 wherein said drive means is a ball and screw device adapted and constructed to operate simultaneously the linkage means of said skids through an arc whereby to selectively lower or raise said skids.

4. A flatrack container comprising a rectangular configured bottom and having two downwardly depending beams spaced from a longitudinal center line and each spaced from a longitudinal edge along the longest sides of said flatrack, each of said edges having an adjustable skid adjunct mounted to the bottom along substantially each edge, each of said skid adjuncts having a relatively thin elongated rectangular plate, said plate having its longest length less than the length of the flatrack, said plate having a bottom surface, said plate having an upper surface, a plurality of linkage means, each of said linkage means having a first end and a second end, a first means mounted on said upper surface adapted and constructed to pivotally attach said first end of said linkage means to said plate, a second means mountable to said underside of said flatrack adapted and constructed to pivotally attach said second end of said linkage means to operatively attach said second end to a underside drive means to progressively drive said linkage means whereby said first end of linkage means and second end of said linkage means pivots whereby said plate is moveable from a folded up position in confrontation with said underside to an extended position whereby said flatrack rests on said skid.

5. The flatrack of claim 4 wherein the elongated side adjuncts drive means is a ball and screw device adapted and constructed to operate simultaneously the linkage means of said skids through an arc whereby to selectively lower or raise said skids.

* * * * *